United States Patent
Gatti

(10) Patent No.: US 9,942,249 B2
(45) Date of Patent: Apr. 10, 2018

(54) PHISHING TRAINING TOOL

(71) Applicant: Bank of America Corporation, Charlotte, NC (US)

(72) Inventor: Benjamin L. Gatti, Lake Park, NC (US)

(73) Assignee: Bank of America Corporation, Charlotte, NC (US)

( * ) Notice: Subject to any disclaimer, the term of this patent is extended or adjusted under 35 U.S.C. 154(b) by 102 days.

(21) Appl. No.: 14/805,719

(22) Filed: Jul. 22, 2015

(65) Prior Publication Data

US 2017/0026388 A1    Jan. 26, 2017

(51) Int. Cl.
*H04L 29/06* (2006.01)
*H04L 12/58* (2006.01)
*H04L 29/08* (2006.01)

(52) U.S. Cl.
CPC .......... *H04L 63/1408* (2013.01); *H04L 51/00* (2013.01); *H04L 51/12* (2013.01); *H04L 63/1483* (2013.01); *H04L 67/22* (2013.01)

(58) Field of Classification Search
CPC ............. H04L 63/1433; H04L 63/1441; H04L 63/1483
See application file for complete search history.

(56) References Cited

U.S. PATENT DOCUMENTS

| | | |
|---|---|---|
| 7,356,564 B2 | 4/2008 | Hartselle et al. |
| 7,499,976 B2 | 3/2009 | Cato |
| 7,603,718 B2 | 10/2009 | Rounthwaite et al. |
| 7,908,328 B1 | 3/2011 | Hulten et al. |
| 7,925,883 B2 | 4/2011 | Florencio et al. |
| 7,930,289 B2 | 4/2011 | Cheshire |
| 8,041,769 B2 | 10/2011 | Shraim et al. |
| 8,255,468 B2 | 8/2012 | Vitaldevara et al. |
| 8,352,318 B2 | 1/2013 | Rikhtverchik et al. |
| 8,381,292 B1 | 2/2013 | Warner et al. |
| 8,484,741 B1 | 7/2013 | Chapman |

(Continued)

OTHER PUBLICATIONS

Prakash et al., A Reputation-Based Approach for Efficient Filtration of Spam, 2011, Cloudmark, Inc.,pp. 1-13, downloaded from https://www.cloudmark.com/en/s/resources/whitepapers/reputation-based-approach-for-efficient-filtration-of-spam on Sep. 13, 2016.*

*Primary Examiner* — Carl Colin
*Assistant Examiner* — Gary Lavelle
(74) *Attorney, Agent, or Firm* — Michael A. Springs

(57) ABSTRACT

According to one embodiment, an apparatus is configured to communicate a first plurality of phishing emails to a first plurality of users, each phishing email of the first plurality of phishing emails is of a first type or a second type. The apparatus is configured to determine a first response rate of the first plurality of users to phishing emails of the first type and to determine a second response rate of the first plurality of users to phishing emails of the second type. The apparatus is configured to determine a second plurality of phishing emails comprising phishing emails of the first type and the second type, wherein an aggregate response rate of a second plurality of users to the second plurality of phishing emails is predicted to be closer to a target response rate than one or more of the first response rate and the second response rate.

12 Claims, 3 Drawing Sheets

(56) References Cited

U.S. PATENT DOCUMENTS

| | | | |
|---|---|---|---|
| 8,615,807 B1 * | 12/2013 | Higbee | G06Q 10/107 726/22 |
| 8,621,614 B2 * | 12/2013 | Vaithilingam | G06Q 10/107 713/154 |
| 8,635,666 B2 | 1/2014 | Curnyn | |
| 8,635,703 B1 | 1/2014 | Belani et al. | |
| 8,640,231 B2 | 1/2014 | Florencio et al. | |
| 8,689,341 B1 | 4/2014 | Hartmann et al. | |
| 8,695,100 B1 | 4/2014 | Cosoi | |
| 8,719,940 B1 * | 5/2014 | Higbee | H04L 63/1408 709/206 |
| 8,793,799 B2 | 7/2014 | Fritzson et al. | |
| 8,910,287 B1 | 12/2014 | Belani et al. | |
| 8,966,637 B2 | 2/2015 | Belani et al. | |
| 9,027,126 B2 * | 5/2015 | Larkins | G06F 21/554 713/182 |
| 9,367,872 B1 * | 6/2016 | Visbal | G06F 17/30601 |
| 2008/0172738 A1 * | 7/2008 | Bates | G06F 17/30887 726/22 |
| 2008/0196099 A1 * | 8/2008 | Shastri | H04L 12/581 726/12 |
| 2012/0046937 A1 | 2/2012 | Ocke et al. | |
| 2012/0124671 A1 * | 5/2012 | Fritzson | G06F 21/577 726/26 |
| 2012/0258437 A1 * | 10/2012 | Sadeh-Koniecpol | G09B 5/00 434/362 |
| 2013/0297375 A1 | 11/2013 | Chapman | |
| 2014/0230065 A1 * | 8/2014 | Belani | H04L 63/1433 726/25 |
| 2014/0337995 A1 | 11/2014 | Fritzson et al. | |
| 2015/0012351 A1 | 1/2015 | Harding | |
| 2016/0014151 A1 * | 1/2016 | Prakash | H04L 63/1483 726/22 |

* cited by examiner

PHISHING TRAINING TOOL

TECHNICAL FIELD

This disclosure relates generally to a system for handling phishing emails.

BACKGROUND

Phishing emails and phishing campaigns place computing systems and networks at risk.

SUMMARY OF THE DISCLOSURE

According to one embodiment, an apparatus includes a memory and a processor. The processor is configured to communicate a first plurality of phishing emails to a first plurality of users, each phishing email of the first plurality of phishing emails is of a first type or a second type. The processor is further configured to determine a first response rate of the first plurality of users to phishing emails of the first type and to determine a second response rate of the first plurality of users to phishing emails of the second type. The processor is further configured to determine a second plurality of phishing emails comprising phishing emails of the first type and the second type, wherein an aggregate response rate of a second plurality of users to the second plurality of phishing emails is predicted to be closer to a target response rate than one or more of the first response rate and the second response rate. The processor is also configured to communicate the second plurality of phishing emails to the second plurality of users.

According to another embodiment, a method includes communicating a first plurality of phishing emails to a first plurality of users, each phishing email of the first plurality of phishing emails is of a first type or a second type. The method also includes determining, by a processor, a first response rate of the first plurality of users to phishing emails of the first type and determining, by the processor, a second response rate of the first plurality of users to phishing emails of the second type. The method further includes determining, by the processor, a second plurality of phishing emails comprising phishing emails of the first type and the second type, wherein an aggregate response rate of a second plurality of users to the second plurality of phishing emails is predicted to be closer to a target response rate than one or more of the first response rate and the second response rate. The method also includes communicating the second plurality of phishing emails to the second plurality of users.

According to another embodiment, a system includes a plurality of users and a phishing management device configured to communicate a first plurality of phishing emails to a first plurality of users, each phishing email of the first plurality of phishing emails is of a first type or a second type. The phishing management device is also configured to determine a first response rate of the first plurality of users to phishing emails of the first type and to determine a second response rate of the first plurality of users to phishing emails of the second type. The phishing management device is further configured to determine a second plurality of phishing emails comprising phishing emails of the first type and the second type, wherein an aggregate response rate of a second plurality of users to the second plurality of phishing emails is predicted to be closer to a target response rate than one or more of the first response rate and the second response rate. The phishing management device is also configured to communicate the second plurality of phishing emails to the second plurality of users.

Certain embodiments may provide one or more technical advantages. For example, an embodiment may reduce the chances of spreading a phishing email. As another example, an embodiment may reduce the effectiveness of phishing emails. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
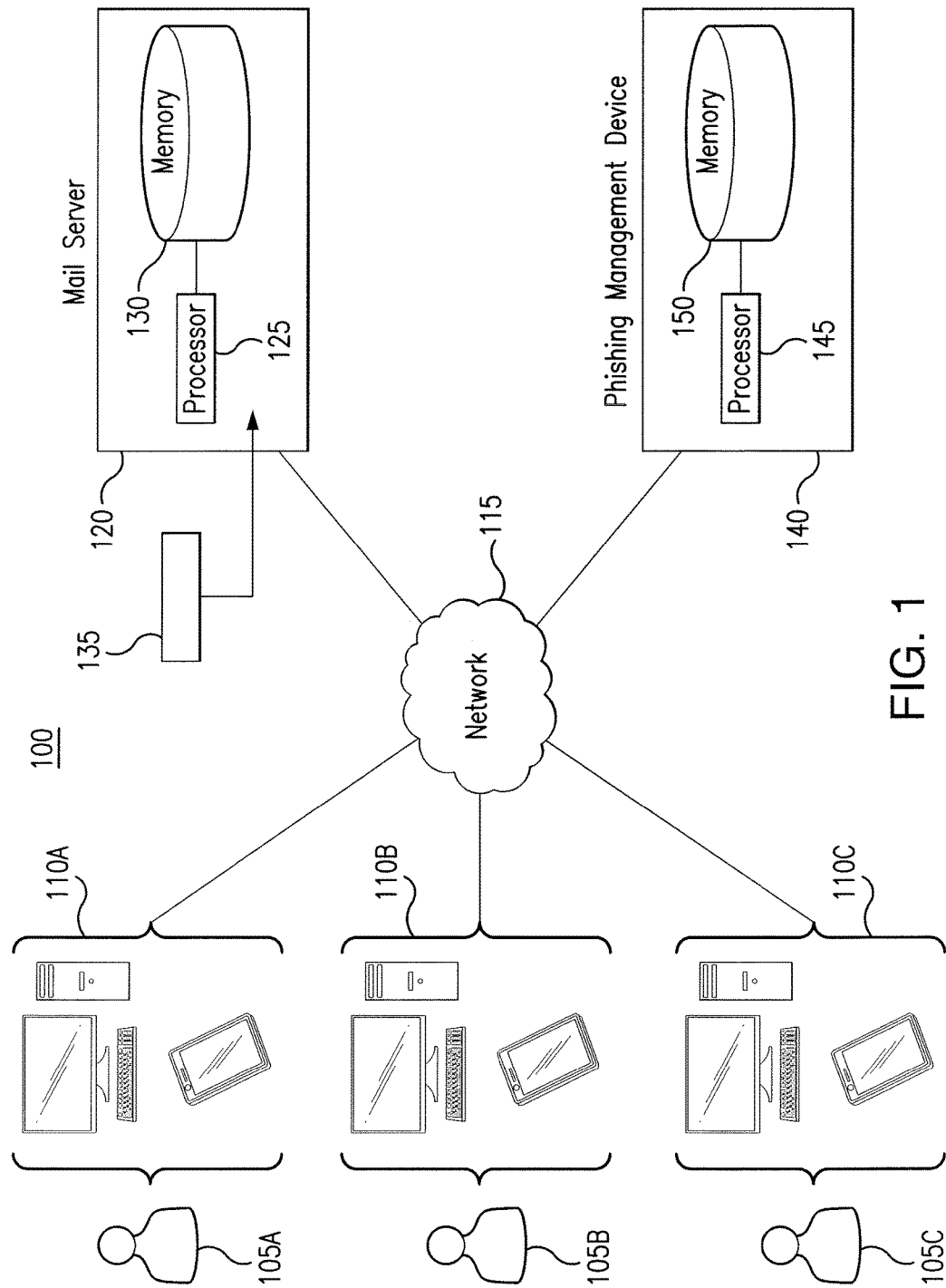
FIG. 1 illustrates a system for handling phishing emails.
Figure 2:
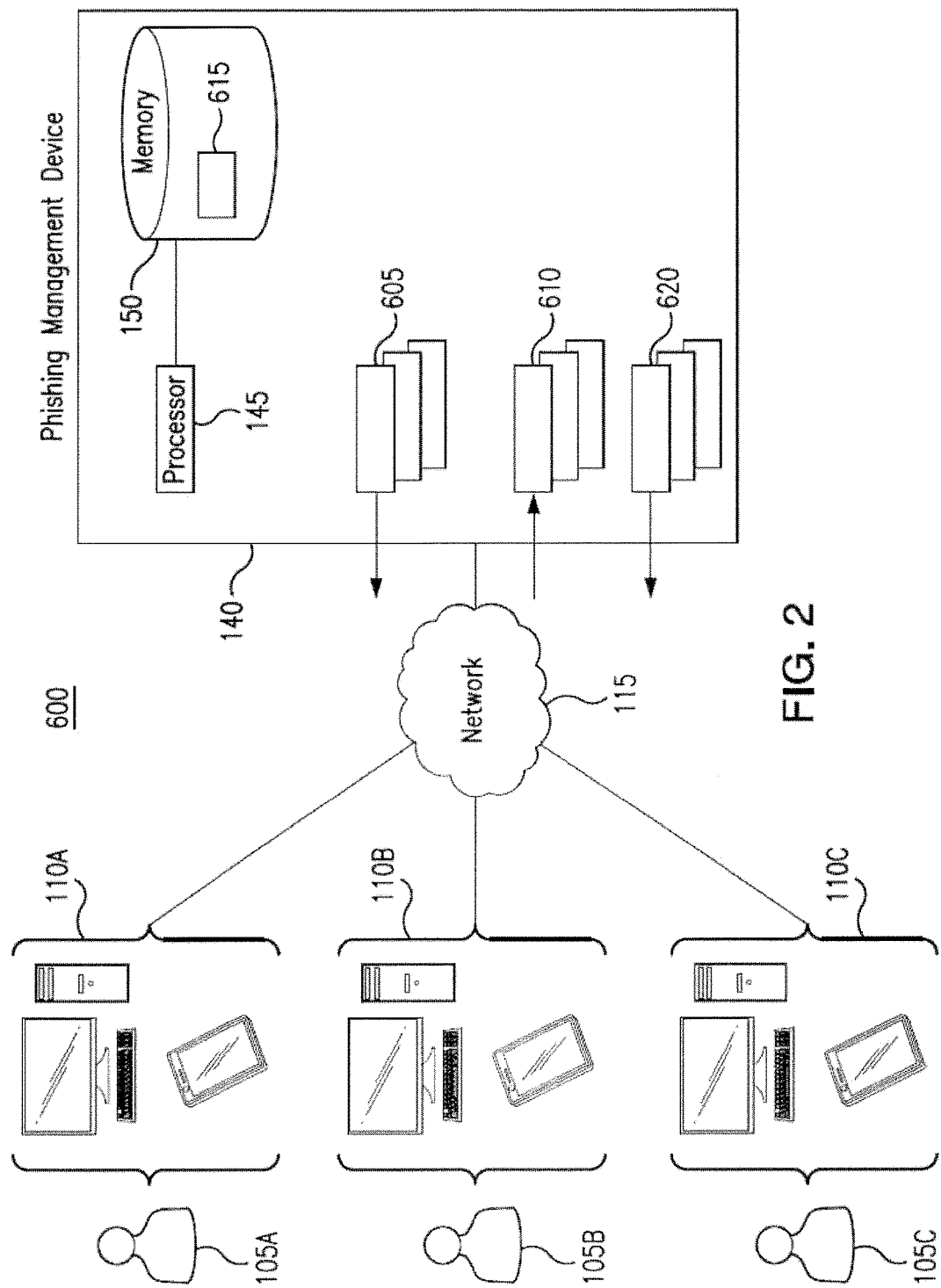
FIG. 2 illustrates phishing training using the system of FIG. 1.
Figure 3:
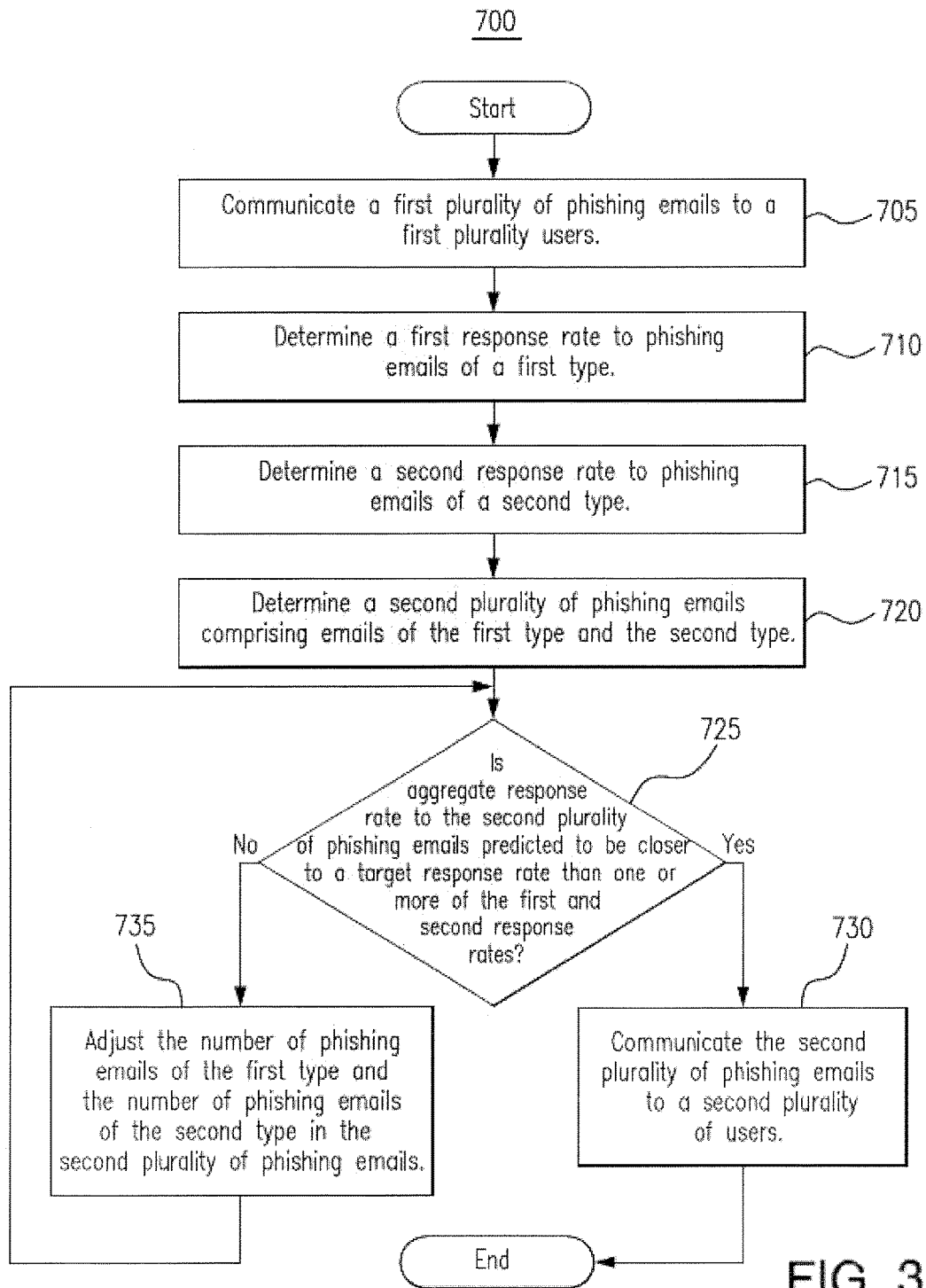
FIG. 3 is a flowchart illustrating a method of phishing training using the system of FIG. 1.

Embodiments of the present disclosure and its advantages are best understood by referring to FIGS. 1 through 3 of the drawings, like numerals being used for like and corresponding parts of the various drawings.

Phishing scams place computing systems and networks at substantial risk. Phishing typically involves the sending of emails and/or messages that attempt to deceive the recipient into providing personally identifiable information, passwords, and any other information that, when known by an unauthorized party, may threaten the security of the system and/or network. Phishing may also involve sending emails and/or messages that deceive the recipient into installing viruses and/or worms onto the recipient's device. Because the success of a phishing scam may depend on the response of only one recipient and because the number of recipients may be large, it may be difficult to prevent a phishing scam from jeopardizing the security of a system and/or network. For example, if a phishing email is sent to one thousand users on a network it may be difficult to ensure that all one thousand users do not fall victim to the phishing email.

This disclosure provides a system that may reduce the chances that a user may fall victim to a phishing scam. For example, the system may train users to identify phishing emails and assign a score to each user indicating the user's susceptibility to phishing scams. In certain embodiments, by using this system, various technical advantages may be realized. For example, in one embodiment, using the system may reduce the chances of spreading a phishing email. As another example, in another embodiment, the system may reduce the effectiveness of phishing emails. The system will be described generally using FIG. 1. The various functions performed by the system will be described in more detail using FIGS. 2 and 3. Although this disclosure primarily describes phishing within the context of email, this disclosure contemplates phishing scams within any messaging context including text messaging, chat messaging, and/or any other appropriate messaging scheme.

FIG. 1 illustrates a system 100 for handling phishing emails. As provided in FIG. 1, system 100 includes users 105A, 105B and 105C, devices 110A, 110B, and 110C, network 115, mail server 120, and phishing management device 140. The components of system 100 may be communicatively coupled to each other through network 115. For ease of illustration, the number of illustrated components of system 100 is limited, but this disclosure contemplates system 100 including any number of users 105, devices 110, networks 115, mail servers 120, and phishing management devices 140.

A user 105 may use device 110 to perform various functions related to email. For example, user 105 may use device 110 to compose email, read email, reply and/or forward email, and/or delete email. This disclosure contemplates device 110 being any appropriate device for sending and receiving communications over network 115. As an example and not by way of limitation, device 110 may be a computer, a laptop, a wireless or cellular telephone, an electronic notebook, a personal digital assistant, a tablet, or any other device capable of receiving, processing, storing, and/or communicating information with other components of system 100. Device 110 may also include a user interface, such as a display, a microphone, keypad, or other appropriate terminal equipment usable by user 105. In some embodiments, an application executed by device 110 may perform the functions described herein.

Network 115 may facilitate communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Mail server 120 may handle the email traffic of system 100. As provided in FIG. 1, mail server 120 may include a processor 125 and a memory 130. Processor 125 and memory 130 may be communicatively coupled to each other. This disclosure contemplates processor 125 and memory 130 being configured to perform any of the functions of mail server 120 described herein. For example, processor 125 and memory 130 may be configured to receive email and/or store email.

Processor 125 may execute software stored on memory 130 to perform any of the functions described herein. Processor 125 may control the operation and administration of mail server 120 by processing information received from network 115, device 110, and memory 130. Processor 125 may include any hardware and/or software that operates to control and process information. Processor 125 may be a programmable logic device, a microcontroller, a microprocessor, any suitable processing device, or any suitable combination of the preceding.

Memory 130 may store, either permanently or temporarily, data, operational software, or other information for processor 125. Memory 130 may include any one or a combination of volatile or non-volatile local or remote devices suitable for storing information. For example, memory 130 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 130, a disk, a CD, or a flash drive. In particular embodiments, the software may include an application executable by processor 125 to perform one or more of the functions described herein.

Mail server 120 may manage the email traffic of system 100. For example, mail server 120 may receive an email 135. Mail server 120 may then determine which user 105 is the intended recipient of email 135. Mail server 120 may then deliver email 135 to the appropriate device 110. Mail server 120 may also store email 135. When a user 105 uses device 110 to reply, forward, and/or delete email 135, mail server 120 may receive a command from the device 110. Mail server 120 may then respond appropriately to the command.

Phishing management device 140 may track and/or handle phishing emails received by system 100. As provided in FIG. 1, phishing management device 140 includes a processor 145 and a memory 150. This disclosure contemplates processor 145 and memory 150 being configured to perform any of the functions of phishing management device 140 described herein. Processor 145 may be communicatively coupled to memory 140.

Processor 145 may execute software stored on memory 150 to perform any of the functions described herein. Processor 145 may control the operation and administration of phishing management device 140 by processing information received from network 115, device 110, and memory 150. Processor 145 may include any hardware and/or software that operates to control and process information. Processor 145 may be a programmable logic device, a microcontroller, a microprocessor, any suitable processing device, or any suitable combination of the preceding.

Memory 150 may store, either permanently or temporarily, data, operational software, or other information for processor 145. Memory 150 may include any one or a combination of volatile or non-volatile local or remote devices suitable for storing information. For example, memory 150 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 150, a disk, a CD, or a flash drive. In particular embodiments, the software may include an application executable by processor 145 to perform one or more of the functions described herein.

Phishing management device 140 may perform various functions to reduce the effectiveness of phishing scams. For example, system 100 may allow phishing training. During phishing training, system 100 may communicate a variety of fake and/or training phishing emails to a certain number of users. Based on the response rate of those users, system 100 may determine whether to increase or decrease the number of users who receive subsequent training emails of the variety in order to achieve an aggregate result consistent with pre-established goals. For example, system 100 may determine a response rate for each of the variety of email types, and use the response rate to select an aggregation of emails likely to yield an overall response rate close to a target response rate. System 100 may further select an aggregation of emails such that each recipient has an equal likelihood of success and failure over a plurality of such test or training email engagements. Phishing training will be discussed in more detail using FIGS. 2 and 3.

FIGS. 2 and 3 illustrate phishing training using the system 100 of FIG. 1. Users may be trained to handle phishing emails appropriately if they are trained to detect various types of phishing emails. One way to train users is by sending fake and/or innocuous phishing emails to the users. If the users do not handle the phishing email appropriately, the users may receive a notification telling them that they should have treated the email differently. The results of the training may be tracked to determine which users will need more training in the future.

However, training a large number of users in this manner may not have the desired effects. For example, when a fake phishing email is sent to a large number of users, the users may warn each other about the fake email which reduces the effectiveness of the training. As another example, sending fake phishing emails to a large number of users and analyzing the results from the large number of users is resource intensive. In particular embodiments, system 100 may address these issues by sending a variety fake phishing emails to a small group of users and then adjusting subsequent fake phishing emails based on a response rate to the first fake phishing email.

FIG. 2 illustrates phishing training using the system 100 of FIG. 1. As provided in FIG. 2, phishing management device 140 may perform phishing training by first sending a first plurality of phishing emails 605 of a variety of types to a small number of users. Then, based on a response rate to the first plurality of phishing emails 605, phishing management device 140 may adjust subsequent phishing emails. For example, phishing management device 140 may adjust the number of users that should be sent the subsequent phishing emails. As another example, phishing management device 140 may adjust the types of subsequent phishing emails. For clarity, certain elements of system 100 have not been illustrated in FIG. 2. However, their omission should not be construed as their elimination from system 100.

Phishing management device 140 may communicate a first plurality of phishing emails 605 to a subset of users. Using the illustrated example of FIG. 2, phishing management device 140 may send the first plurality of phishing emails 605 to users 105A and 105B. Phishing management device 140 may have selected users 105A and 105B in any appropriate manner. This disclosure contemplates phishing management device 140 sending first phishing email 605 to any number of users 105.

The first plurality of phishing emails 605 may include a variety of types of phishing emails. For example, some emails may be non-personal, such as emails saying "want to get lucky?" As another example, some emails may be more personal, such as emails stating "you have store credit" or "track your package." Generally, it is anticipated that emails that are more personal are more likely to deceive users 105. This disclosure contemplates the first plurality of phishing emails 605 including emails of any appropriate type. Although only personal and non-personal phishing emails are described, this disclosure contemplates any appropriate number of types of phishing emails.

In particular embodiments, phishing management device 140 may diversify the types of emails received by a user. For example, if a user of the first subset of users received a non-personal email of first plurality of phishing emails 605, then phishing management device may communicate a personal email to the user in a subsequent round of phishing training. In this manner, users may be exposed to several different types of phishing emails and particular weaknesses of each user may be determined.

When the first subset of users receives first plurality of phishing emails 605, those users may respond in various ways. For example, a user may respond to an email of first plurality of phishing emails 605 believing it to be a legitimate email. As another example, the user may delete and/or report the email of first plurality of phishing emails 605 believing it to be a deceptive email. Using the example illustrated in FIG. 2, user 105A may delete the email while user 105B may reply and/or forward the email. Depending on the user's actions, phishing management device 140 may receive responses 610. Responses 610 may indicate the users who responded to first plurality of phishing emails 605.

Based on responses 610, phishing management device 140 may determine response rates for the various types of phishing emails in first plurality of phishing emails 605. The response rates may be the percentage of users of the first subset of users who received a phishing email of the various types and who responded to those emails believing them to be legitimate and thereby fall victim and/or propagate the emails. For example, if first plurality of phishing emails 605 included personal and non-personal phishing emails, phishing management device 140 may determine a first response rate for personal phishing emails and a second response rate for non-personal phishing emails. This process may be extrapolated to include additional response rates for additional types of phishing emails included in first plurality of phishing emails 605. Responses 610 may also indicate the users who deleted first plurality of phishing emails 605 and/or the users who reported first plurality of phishing emails 605.

In particular embodiments, phishing management device 140 may store and/or track the users who responded an email of first plurality of phishing emails 605 believing the email to be legitimate. In this manner, phishing management device 140 may track how each user is responding to the phishing training. Phishing management device 140 may determine the users who are being trained effectively and the users who are not responding well to the training.

Phishing management device 140 may determine the next steps of phishing training by comparing the determined response rates with a target response rate 615 stored in memory 150. Based on this comparison, phishing management device 140 may adjust various aspects of the phishing training. For example, phishing management device 140 may change the number of users that should receive subsequent phishing emails. As another example, phishing management device 140 may adjust the number of subsequent phishing emails of particular types. In particular embodiments, phishing management device 140 may make these adjustments so that an aggregate response rate to subsequent phishing emails is predicted to be closer to the target response rate than the determined response rates.

Using the example illustrated in FIG. 2, phishing management device 140 may determine that the determined response rates are higher than target response rate 615. In response to this determination, phishing management device 140 may increase the number of users that should receive subsequent phishing emails and adjust the composition of subsequent phishing emails to include more emails that are less personal to lower the response rate to be closer to target response rate 615. As another example, phishing management device 140 may determine that the average response rate to first plurality of phishing emails 605 is lower than target response rate 615. In response, phishing management device 140 may adjust the composition of subsequent phishing emails to include more emails that are more personal to raise the response rate to be closer to target response rate 615. In particular embodiments, target response rate 615 may be selected by an administrator and/or set to reflect historical response rates to phishing emails.

In this manner, phishing management device 140 may determine a second plurality of phishing emails 620 that includes phishing emails of the first type and the second type. Phishing management device 140 may predict that the aggregate response rate to second plurality of phishing emails 620 will be closer to target response rate 615 than the previously determined response rates. As a result, when second plurality of phishing emails 620 is communicated, phishing management device 140 may expect that the aggregate response rate will be closer to target response rate 615.

Phishing management device 140 may communicate second plurality of phishing emails 620 a second plurality of users. In particular embodiments, phishing management device 140 may communicate second plurality of phishing emails 620 to a different subset of users than the first subset of users to which first plurality of phishing emails 605 were communicated. For example, phishing management device 140 may increase the number of users that should receive second plurality of phishing emails 620. Using the illustrated example of FIG. 2, phishing management device 140 may communicate first plurality of phishing emails 605 to users 105A and 105B and communicate second plurality of phishing emails 620 to users 105A, 105B and 105C. In certain embodiments, phishing management device 140 may determine that no change should be made and second plurality of phishing emails 620 may be communicated to the same users as first plurality of phishing emails 605.

In particular embodiments, phishing management device 140 may adjust the number of users who receive second plurality of phishing emails 620 by communicating second plurality of phishing emails 620 to those users of the first subset who received first plurality of phishing email 605 and who responded to an email of first plurality of phishing emails 605. In this manner, phishing management device 140 may communicate second plurality of phishing emails 620 to target those users who have demonstrated susceptibility to first plurality of phishing emails 605. In particular embodiments, phishing management device 140 may include each user that responded to an email of first plurality of phishing email 605 in the second subset of users who receive second plurality of phishing emails 620. In this manner, phishing management device 140 may provide subsequent phishing training to users who have demonstrated susceptibility to phishing emails.

As another example, phishing management device 140 may adjust the composition of second plurality of phishing emails 620 so that second plurality of phishing email 620 includes more or less emails of a particular type than first plurality of phishing email 605. For example, if phishing management device 140 determines that the response rate to personal emails of the first plurality of phishing emails 605 is lower than target response rate 615, phishing management device 140 may adjust second plurality of phishing emails 620 to include more emails that are more personal to try to increase the average response rate to be closer to target response rate 615.

In particular embodiments, phishing management device 140 may communicate second plurality of phishing emails 620 to try to get an aggregate response rate closer to target response rate 615. For example, if the response rates to emails of first plurality of phishing emails 605 was higher than target response rate 615, it may indicate that the types of first plurality of phishing emails 605 was effective in deceiving the first subset of users. As a result, phishing management device 140 may expand or increase the number of users to which that type of phishing email should be sent and/or change the composition to include more emails that are less personal. By increasing the number of users to which second phishing email 620 is sent and/or increasing the number of emails that are less personal, phishing management device 140 may expect to lower the average response rate and move it closer to target response rate 615. As another example, if the response rates to the emails of first plurality of phishing emails 605 is lower than target response rate 615, it may indicate that the types of first plurality of phishing emails 605 was ineffective at deceiving users to respond to first plurality of phishing emails 605. As a result, phishing management device 140 may adjust the composition of subsequent phishing emails to include more emails that are more personal to move the average response rate closer to target response rate 615. For example, if first plurality of phishing emails 605 included many non-personal emails, phishing management device 140 may include more personal emails and include less non-personal emails in second plurality of phishing emails 620. When second plurality of phishing emails 620 is communicated, phishing management device 140 may anticipate that the response rate will increase.

In certain embodiments, phishing management device 140 may calculate an aggregate response rate to all phishing emails sent by phishing management device 140. The aggregate response rate may be compared to target response rate 615 to determine how phishing training should proceed. For example, phishing management device 140 may increase the number of users that should receive future training phishing emails if the aggregate response rate is greater than target response rate 615. As another example, phishing management device 140 may adjust the composition of future training phishing emails if the aggregate response rate is lower than target response rate 615. In particular embodiments, phishing management device 140 may determine an aggregate response rate to second plurality of phishing emails 620 and then aggregate the aggregate response rate to first plurality of phishing emails 605 with the aggregate response rate to second plurality of phishing emails 620 to produce an overall aggregate response rate. Phishing management device 140 may then compare the overall average response rate to target response rate 615.

In certain embodiments, phishing management device 140 may assign a score to each user based on the user's performance during phishing training. The score may indicate how likely the user is to respond to phishing emails. For example, if the user responded to an email of first plurality of phishing emails 605 and to an email of second plurality of phishing emails 620, phishing management device 140 may assign a higher score to that user than another user who did not respond to an email of first plurality of phishing emails 605 or to an email of second plurality of phishing emails 620. Phishing management device 140 may use these scores to determine how to handle future phishing scams.

In particular embodiments, by using system 100 to perform phishing training system and/or network security may be improved. For example, system 100 may reduce the chances that certain users will respond to a phishing email through training. As another example, system 100 may track the users who are likely to respond to phishing emails.

FIG. 3 is a flowchart illustrating a method 700 of phishing training using the system 100 of FIG. 1. In particular embodiments, phishing management device 140 may perform method 700. In particular embodiments, by performing method 700, the effectiveness of phishing scams may be reduced.

Phishing management device 140 may begin by communicating a first plurality of phishing emails to a first plurality of users in step 705. The first plurality of users may respond to the first plurality of emails in any appropriate manner. For example, certain users may believe an email of the first plurality of emails to be legitimate and reply to it. As another example, certain users may believe an email of the first plurality of emails to be a phishing email and delete and/or report the email. Certain users of the first plurality of users may receive an email of a first type and other users may receive an email of a second type.

After receiving the responses from the first plurality of users, phishing management device 140 may determine the response rates to emails of various types. For example, in step 710, phishing management device 140 may determine a first response rate to phishing emails of a first type (e.g., personal emails). In step 715, phishing management device 140 may determine a second response rate to phishing emails of a second type (e.g., non-personal emails). This disclosure contemplates phishing management device 140 determining response rates for any number of types of emails.

In step 720, phishing management device 140 may determine a second plurality of phishing emails comprising emails of the first type and the second type. In particular embodiments, phishing management device 140 may adjust the number of emails of each type in the second plurality of phishing emails so that an expected or predicted aggregate response rate to the second plurality of phishing emails is closer to a target response rate than the response rates to the emails in the first plurality of phishing emails. In step 725, phishing management device 140 may determine whether an aggregate response rate to the second plurality of emails is predicted to be closer to a target response rate than one or more of the first and second response rates. If so, phishing management device 140 may communicate the second plurality of phishing emails to a second plurality of emails in step 730. If not, phishing management device 140 may adjust the number of phishing emails of the first type and the number of phishing emails of the second type in the second plurality of phishing emails in step 735.

As an example, phishing management device 140 may determine that in order to raise the aggregate response rate, more personal emails and fewer non-personal emails should be sent. As a result, phishing management device 140 may adjust the composition of the second plurality of phishing emails to include more personal emails and fewer non-personal emails. As another example, phishing management device 140 may determine that in order to lower the aggregate response rate, more non-personal emails and fewer personal emails should be sent. As a result, phishing management device 140 may adjust the composition of the second plurality of phishing emails to include more non-personal emails and fewer personal emails.

Modifications, additions, or omissions may be made to method 700 depicted in FIG. 3. Method 700 may include more, fewer, or other steps. For example, steps may be performed in parallel or in any suitable order. While discussed as phishing management device 140 performing the steps, any suitable component of system 100, such as device 110 for example, may perform one or more steps of the method.

This disclosure contemplates users 105A, 105B and 105C responding to phishing emails in any appropriate manner. For example, users 105A, 105B and 105C may respond to a phishing email by clicking a link in the phishing email. As another example, users 105A, 105B and 105C may respond to a phishing email by replying to it. As another example, users 105A, 105B and 105C may respond to a phishing email by opening an attachment in the phishing email. As further examples, users 105A, 105B, and 105C may respond by forwarding the phishing email, deleting the phishing email, opening the phishing email, opening the phishing email, reading the phishing email, opening an attachment in the phishing email, calling a phone number in the phishing email, and/or reporting the phishing email.

Modifications, additions, or omissions may be made to system 100 without departing from the scope of the invention. For example, phishing management device 14 may be a distributed system. As another example, the components of system 100 may be integrated or separated. For example, mail server 120 may be incorporated into phishing management device 140, and vice versa.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An apparatus comprising:
   a memory; and
   a processor communicatively coupled to the memory, the processor configured to:
   communicate a first plurality of phishing emails to a first plurality of users, each phishing email of the first plurality of phishing emails is of a first type or a second type;
   determine a first response rate of the first plurality of users to phishing emails of the first type;
   determine a second response rate of the first plurality of users to phishing emails of the second type;
   determine, based on the first and second response rates of the first plurality of users, a second plurality of phishing emails comprising phishing emails of the first type and the second type, wherein an aggregate response rate of a second plurality of users to the second plurality of phishing emails is predicted to be closer to a target response rate than one or more of the first response rate and the second response rate;
   communicate the second plurality of phishing emails to the second plurality of users, wherein the second plurality of phishing emails comprises a different number of phishing emails of the first type than the first plurality of phishing emails and a different number of phishing emails of the second type than the second plurality of phishing emails;
   determine the different number of phishing emails of the first type based on the first response rate;
   determine that a user of the first plurality of users previously received a phishing email of the first type, wherein, in response to the determination that the user previously received the phishing email of the first type, communicating the first plurality of phishing emails comprises communicating a phishing email of the second type to the user; and
   assign a score to the user of the first plurality of users based on whether the user responded to a phishing email of the first plurality of phishing emails, the score indicating how likely the user is to respond to another phishing email.

2. The apparatus of claim 1, wherein the processor is further configured to communicate a subsequent phishing email to the first plurality of users who responded to a phishing email of the first plurality of phishing emails.

3. The apparatus of claim 1, wherein the processor is further configured to track the users of the first plurality of users who responded to a phishing email of the first plurality of phishing emails.

4. The apparatus of claim 1, wherein the first plurality of users comprises fewer users than the second plurality of users.

5. A method comprising:
communicating a first plurality of phishing emails to a first plurality of users, each phishing email of the first plurality of phishing emails is of a first type or a second type;
determining, by a processor, a first response rate of the first plurality of users to phishing emails of the first type;
determining, by the processor, a second response rate of the first plurality of users to phishing emails of the second type;
determining, by the processor, based on the first and second response rates of the first plurality of users, a second plurality of phishing emails comprising phishing emails of the first type and the second type, wherein an aggregate response rate of a second plurality of users to the second plurality of phishing emails is predicted to be closer to a target response rate than one or more of the first response rate and the second response rate;
communicating the second plurality of phishing emails to the second plurality of users, wherein the second plurality of phishing emails comprises a different number of phishing emails of the first type than the first plurality of phishing emails and a different number of phishing emails of the second type than the second plurality of phishing emails;
determining the different number of phishing emails of the first type based on the first response rate;
determining that a user of the first plurality of users previously received a phishing email of the first type, wherein, in response to the determination that the user previously received the phishing email of the first type, communicating the first plurality of phishing emails comprises communicating a phishing email of the second type to the user; and
assigning a score to the user of the first plurality of users based on whether the user responded to a phishing email of the first plurality of phishing emails, the score indicating how likely the user is to respond to another phishing email.

6. The method of claim 5, further comprising communicating a subsequent phishing email to the first plurality of users who responded to a phishing email of the first plurality of phishing emails.

7. The method of claim 5, further comprising tracking the users of the first plurality of users who responded to a phishing email of the first plurality of phishing emails.

8. The method of claim 5, wherein the first plurality of users comprises fewer users than the second plurality of users.

9. A system comprising:
a plurality of users; and
a phishing management device configured to:
communicate a first plurality of phishing emails to a first plurality of users, each phishing email of the first plurality of phishing emails is of a first type or a second type;
determine a first response rate of the first plurality of users to phishing emails of the first type;
determine a second response rate of the first plurality of users to phishing emails of the second type;
determine, based on the first and second response rates of the first plurality of users, a second plurality of phishing emails comprising phishing emails of the first type and the second type, wherein an aggregate response rate of a second plurality of users to the second plurality of phishing emails is predicted to be closer to a target response rate than one or more of the first response rate and the second response rate;
communicate the second plurality of phishing emails to the second plurality of users, wherein the second plurality of phishing emails comprises a different number of phishing emails of the first type than the first plurality of phishing emails and a different number of phishing emails of the second type than the second plurality of phishing emails;
determine the different number of phishing emails of the first type based on the first response rate;
determine that a user of the first plurality of users previously received a phishing email of the first type, wherein, in response to the determination that the user previously received the phishing email of the first type, communicating the first plurality of phishing emails comprises communicating a phishing email of the second type to the user; and
assign a score to the user of the first plurality of users based on whether the user responded to a phishing email of the first plurality of phishing emails, the score indicating how likely the user is to respond to another phishing email.

10. The system of claim 9, wherein the phishing management device is further configured to communicate a subsequent phishing email to the first plurality of users who responded to a phishing email of the first plurality of phishing emails.

11. The system of claim 9, wherein the phishing management device is further configured to track the users of the first plurality of users who responded to a phishing email of the first plurality of phishing emails.

12. The system of claim 9, wherein the first plurality of users comprises fewer users than the second plurality of users.

* * * * *